United States Patent [19]

Feller

[11] 4,375,926
[45] Mar. 8, 1983

[54] DEVICE FOR REMOVING COMPONENTS FROM SHAFTS

[75] Inventor: Thomas R. Feller, Milwaukee, Wis.

[73] Assignee: Allis-Chalmers Corporation, Milwaukee, Wis.

[21] Appl. No.: 287,105

[22] Filed: Jul. 27, 1981

[51] Int. Cl.³ .................. F16D 1/00; F16L 17/00; F16L 29/00
[52] U.S. Cl. .................................. 403/15; 403/31
[58] Field of Search .................. 403/15, 31

[56] References Cited

U.S. PATENT DOCUMENTS

| | | | |
|---|---|---|---|
| Re. 29,968 | 4/1979 | Geese et al. | 403/15 |
| 2,988,387 | 6/1961 | Eschmann et al. | 403/15 |
| 3,033,597 | 5/1962 | Miller | 403/15 |
| 3,937,103 | 2/1976 | Kleinhans | 403/15 X |

FOREIGN PATENT DOCUMENTS

| | | | |
|---|---|---|---|
| 54-47063 | 4/1979 | Japan | 403/15 |
| 625899 | 9/1978 | U.S.S.R. | 403/15 |

Primary Examiner—Wayne L. Shedd
Attorney, Agent, or Firm—Thomas G. Anderson

[57] ABSTRACT

A tightly fitted assembly including an impeller mounted on a tapered shaft with an interference fit. The impeller includes a piston and cylinder arrangement adapted to supply an axially acting force to the impeller to disengage it from the shaft while fluid pressure is applied to the bore of the impeller to break the interference fit between the shaft and impeller.

11 Claims, 2 Drawing Figures

DEVICE FOR REMOVING COMPONENTS FROM SHAFTS

BACKGROUND OF THE INVENTION

Impellers or coupling hubs and the like used in compressors, pumps and related machinery are currently being mounted on associated shafting by utilizing hydraulic fluid under high pressure. This pressure is admitted into the impeller bore and acts to expand the bore to provide sufficient clearance to permit advancing the impeller hub onto the shaft during assembly. Once the impeller is in position, the hydraulic fluid pressure is reduced, thereby allowing the bore to contract so that the impeller hub grips the shaft with a precalculated interference fit.

In order to remove the impeller from the shaft, it has generally been necessary to heat it with a torch or the like to expand it enough to release the interference fit between the impeller and the shaft, or alternatively, use a suitable pulling device to pull the impeller off the shaft. While heating the impeller with a torch accommodates its removal from the shaft, this generally cannot be done where the pump or compressor is used in a chemical plant or the like where explosive vapors may be ignited by the open flame of the torch. In this type of situation, it has been the practice to use a mechanical pulling device to separate the impeller from the shaft. However, in many cases where there is a very high interference fit and a small angle of taper, the force required to pull the impeller off the shaft exceeds the capacity of the pulling devices which can be used at the location where the compressor or pump is installed. Consequently it has often been necessary to move the entire compressor or pump to an area where it is safe to use an open flame for the removal operation. In practice this has proven to be a relatively complicated and costly procedure.

The prior art also teaches the use of hydraulic fluid pressure to reduce the interference fit between an impeller hub and a shaft when the hub is to be removed from the shaft as well as when it is mounted on it. For example U.S. Pat. Nos. 2,840,399 and 3,061,342 teach the use of pressurized grease as the hydraulic medium so that lubrication of the shaft is obtained in conjunction with hub expansion. However, in these devices the interference fit at the interface of the hub and the shaft defines a highly tapered cone with a relatively low pressure interference fit between the hub and the shaft. In contrast to the foregoing patents, U.S. Pat. No. 2,946,610 shows a related arrangement utilizing hydraulic pressure in a relatively complicated hub and shaft structure having a stepped design wherein the interface between the hub and the shaft is divided into at least two step portions of progressively larger diameters. This accommodates installing the hub on the shaft in a relationship which provides a space between the internal radial face portions of the steps. Thus, when it is desired to separate the interference fit between the hub and the shaft, fluid is supplied under pressure into each of the spaces which acts to move one member axially relative to the other.

SUMMARY OF THE INVENTION

The present invention relates to assemblies of tightly fitted members and in particular to a method and arrangement for releasably securing an impeller or coupling hub to associated shafting in compressors, pumps, and related machinery.

In the present invention, the hub of the impeller is provided with a conically tapered bore which is sized to receive a correspondingly tapered section at the end of a compressor or pump shaft to form an interference fit securing the impeller to the shaft. The impeller is counterbored at the inner end of the tapered bore to receive a stationary piston or sealing ring forming an annular chamber within the counterbore on one side of the ring which in turn abuts an annular shoulder projecting from the shaft on the other side of the ring. The shaft, which includes an outwardly opening annular groove extending about its periphery within the tapered bore of the impeller, is provided with a series of fluid passages adapted to direct hydraulic fluid into the annular chamber as well as the annular groove, it being noted that a removable, self-aligning plug or seal is provided in the passage between the annular chamber and the annular groove.

When installing the impeller on the shaft, the self-aligning plug is secured in the fluid passage to prevent hydraulic fluid from flowing into the annular chamber. A suitable hydraulic supply is then connected with the fluid passage to pressurize the annular groove to a preselected level at which the hydraulic fluid acts to expand the hub of the impeller so that the tapered bore of the hub can be slid into position about the correspondingly tapered section at the end of the shaft. Thereafter, the pressure is released which allows contraction of the hub to form an interference fit between the impeller and the shaft.

When it is desired to remove the impeller from the shaft, the plug is first removed from the fluid passage. Then, the hydraulic supply is connected to the passage which is then pressurized to a predetermined level. This allows hydraulic fluid in the annular groove to expand the hub to reduce or break the interference fit between the hub and the shaft while the fluid in the annular chamber simultaneously acts to move the impeller outwardly along the shaft to a position where it can be easily removed from the shaft.

From the foregoing, it can be seen that the invention contemplates an arrangement wherein tightly fitted machine members can be secured together or detached without the use of heat or cumbersome pulling equipment. However, it is to be understood that various changes can be made in the arrangement, form and construction of the apparatus disclosed herein without departing from the spirit and scope of the invention.

DESCRIPTION OF THE PREFERRED EMBODIMENT

Figures 1, 2:
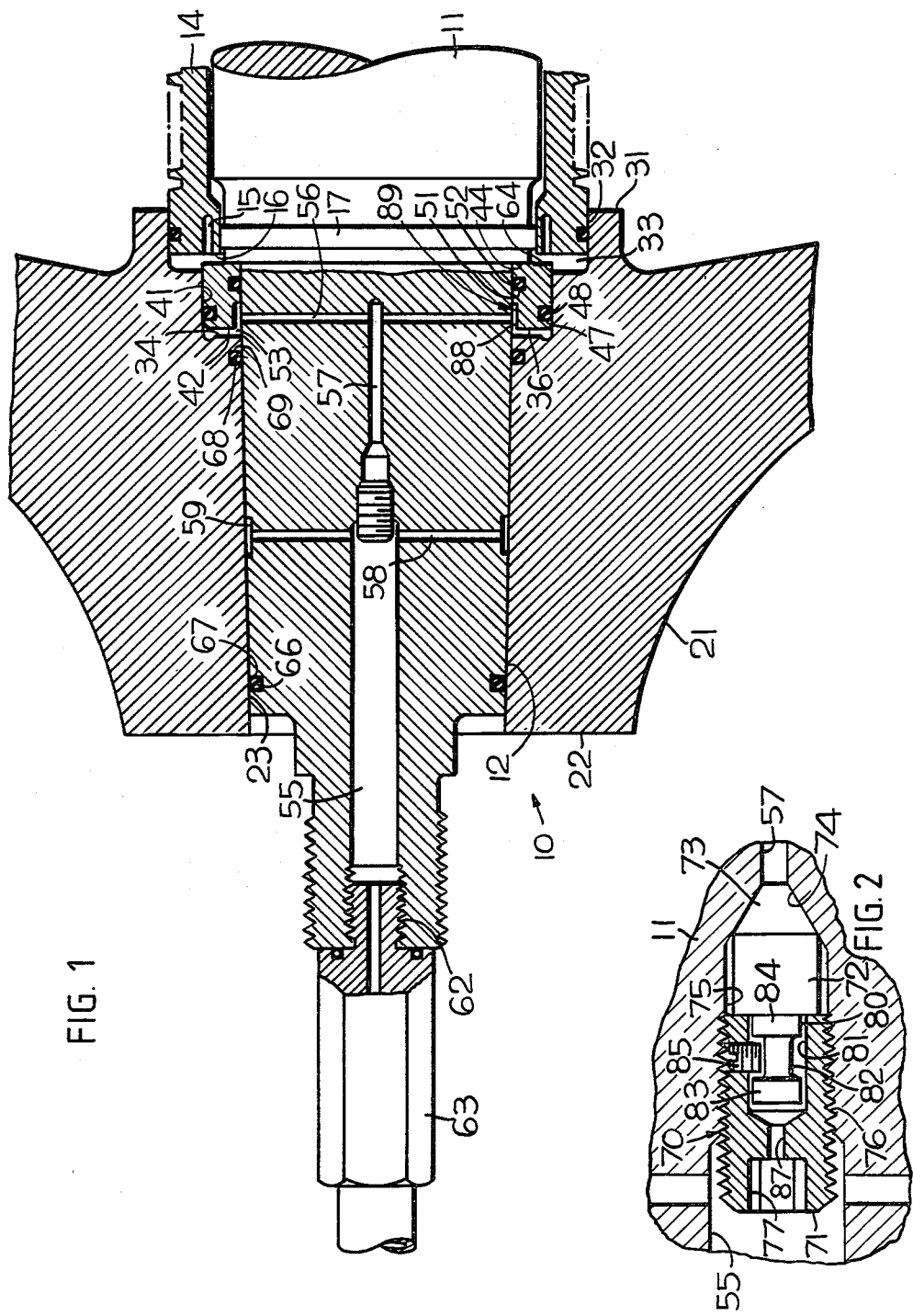
FIG. 1 is a fragmentary longitudinal sectional view through the impeller and shaft seat showing the construction for effecting removal of the impeller; and, FIG. 2 is an enlarged view of the self-aligning plug.

Referring to FIG. 1 there is shown an impeller assembly 10 embodying the invention which includes shaft 11 carrying an impeller 21. The impeller shaft 11 includes a conically tapered surface portion 12 which is tapered at an angle of 10 degrees or less to the axis of the shaft to form what is commonly referred to as a self-locking taper. As shown in the drawing, the shaft 11 includes a gas seal sleeve 14. The groove 15 forms a resilient circular reduced section 16 which acts as a spring and engages a land 17 formed on the shaft 11.

The impeller 21 is mounted on the tapered surface portion 12 of the shaft. To this end, the impeller hub 22 is formed with an axial bore 23 having a conical, self-locking taper matching the taper of the tapered portion 12 to form a high interference fit between the bore 23 and the tapered portion 12. Additionally, the rightward end of the impeller as it is shown in the drawing is formed with an axially extending circular cuff portion 31 within which seats the circular end portion 32 of the shaft sleeve 14 to act as a gas seal preventing any residual hydraulic oil from getting into the process gas or the process gas from getting into impeller bore.

In the past, because of the high interference fit between the engaged surfaces of that impeller and the shaft, removal of the impeller is extremely difficult. As noted above in regard to the prior art, in order to remove the impeller from the shaft it has generally been necessary to heat the impeller with a torch or by using a heavy mechanical puller. However, in many areas where compressors or the like are utilized, an open flame is not permitted because of the danger of explosion or fire. Similarly, many mechanical pullers of a size sufficient to handle large impeller assemblies are extremely difficult to work with and in many cases cannot be used because of space limitations. Moreover, mechanical pullers can damage both the impeller bore and the shaft, both of which are very costly to repair.

The present invention contemplates a hydraulic arrangement which is usable for mounting the impeller 21 on the shaft portion 12 and is also operable for removing the impeller from the shaft. To this end, the right inner end of the axial bore 23 in the impeller is provided with a counterbore 41 which receives a stationary piston or sealing ring 42 defining an annular chamber 53 within the counterbore between the bottom face 34 of the counterbore and inner face 36 of the sealing ring 42. The sealing ring 42 is supported on a cylindrical portion of the shaft 11 inward of the tapered portion 12 provided on the shaft 11 in abutting engagement with an annular shoulder or axial face 44 formed when machining the shaft 11 to form the tapered portion 12. Additionally, an annular groove 47 is formed in the external surface of the sealing ring 42 which receives an O-ring 48 which is sized to engage the interior periphery of the counterbore 41, and another annular groove 51 is formed in the axial bore of the sealing ring which receives an O-ring 52 which is sized to surroundingly engage the shaft 11. The O-rings 48 and 52 thus effectively prevent fluid under pressure from passing into the space 33 from the annular chamber 53. To further enhance the seal, the sealing ring 41 is counterbored as indicated at 88 to provide an annular hydraulic chamber between the shaft 11 and the ring 41 proximate the outer O-ring 48. This arrangement results in pressurization of the chamber 88 upon pressurization of the chamber 53 which expands the sealing ring to assure a tight seal between the ring 42 and the interior periphery of the counterbore 41.

Fluid under pressure is supplied to the annular chamber 53 through one or more radial passages 56 formed in the shaft portion 12 transverse of the shaft axis which extends in communication from the inner end section 57 of a central or axially aligned supply passage 55 extending from the end of the shaft. As shown in the drawing, another set of radial passageways 58 extend into the shaft approximately midway from the radial passages 56 and the outer end of the shaft portion 12. These passages provide fluid communication between an enlarged annular groove 59 formed in the surface of the shaft portion 12 between a pair of spaced O-rings or annular seals 66 and 68 in grooves 67 and 69 formed about the periphery of the shaft and the outer section of the supply passage 55. As shown in FIG. 1, the outer end of the supply passage includes an internally threaded coupling or fitting receiving bore 62 at the outer end of the counterbore which is adapted to receive the threaded end of a pressure hose or pipe coupling 63. As will be described, during installation and removal of the impeller from the shaft, the hose coupling 63 is connected to a conventional hydraulic fluid source (not shown) which supplies hydraulic fluid under high pressure to the supply passage 55.

When mounting the impeller on the shaft, it is necessary to prevent pressurization of the end section 57 as it would result in pressurization of the annular chamber 53 which would force the impeller outward along the shaft, countering the mounting effort. However, when removing the impeller it is essential that both the annular chamber 53 and the annular groove 59 be pressurized. For this purpose, the invention incorporates a removable, self-aligning plug assembly 70 which can be secured in the supply passage 55 to seal off the end section 57 from the outer section of the supply passage 55.

As shown in FIG. 2, the plug assembly 70 includes a machined set screw 71 having an allen-wrench socket 77 and a plug body 72 which is designed to swivel with respect to the set screw 71 when securing the plug assembly in the passage 55. The plug body 72 is provided with a conical nose 73 which is adapted to be tightly engaged in a corresponding conical recess or plug seat 74 formed at the entrance of the end section 57 in a connecting passage 75 which provides fluid communication between the end section 57 and the outer section of the supply passage 55. As can be seen from the drawings, the plug body 72 moves smoothly in the connecting passage 75 and can be retained in the plug seat 74 to seal off the entrance to the end section 57 by the set screw 71 which is secured by threading 76 at the outer end of the connecting passage 75. The plug body 72 is provided with an axially extending stem 80 of a lessor diameter than the diameter of the bore 81 formed in the inner end of the set screw 71. As shown in FIG. 2, an annular groove 82 is formed in the stem 80 to form spaced stops 83 and 84. The stops 83 and 84 cooperate with a locking screw 85 which is threadably engaged in a radially extending threaded opening formed in the set screw 71. The locking screw 85 is adapted to have its nose engaged in the groove 82 between the spaced stops 83 and 84 in a manner permitting axial and tilting, swivelling movement of the plug body relative to the set screw. More particularly, since the plug body 72 can swivel with respect to the set screw 71, the plug body freely seats itself in the recess 74 to seal off the inner section 57 as the set screw 71 it tightened. Moreover, the swivel-like connection between the plug body and the set screw allows the plug body to remain stationary as the set screw is tightened to essentially eliminate galling of the interengaging surfaces of the plug body and the seat 74. In this regard, it should be noted that although the set screw 71 in the embodiment shown is adjusted with an allen-wrench engaged in the socket 77, various other well know means can be used for this purpose.

When mounting the impeller on the shaft, the plug assembly 70 is secured in the connecting passage 75 to seal off the end section 57 to prevent hydraulic fluid from entering the radial passages 56. Next, the hydraulic fluid source is connected to the receiving bore 62 to introduce hydraulic fluid under a pressure of 23,000-27,000 psi into the bore 23 of the impeller hub 22 in the annular groove 59 between the seals 66 and 67. The high pressure of the fluid expands the bore 23 to provide enough clearance to advance the impeller onto the shaft portion 12. It should be noted that a mechanical or hydraulic drive arrangement (not shown) is usually employed to apply a regulated axial force to the impeller to advance it along the shaft into the installed position shown in FIG. 1. Then, the hydraulic pressure is released whereupon the impeller hub contracts to grip the shaft with a precalculated, locking interference fit. Thereafter, the hydraulic source is disconnected from the receiving bore 62. The plug assembly 70 is then loosened to vent any air from the passages 56 and the annular chamber 53 through the venting port 87 provided in the set screw 71, whereafter the plug assembly 70 is retightened.

When it is desired to remove the impeller from the shaft, the plug assembly 70 is first removed from the connecting passage 75 so that the hydraulic fluid can flow into the passages 57 and 56 through the passage 75 while at the same time feeding passage 58. Next, the hydraulic fluid source is connected to the receiving bore 62 to simultaneously introduce hydraulic fluid which gradually increases to a pressure in the range of 12,000-17,000 psi into the annular groove 59 via passages 55 and 58 and into the annular chamber 53 via the passages 55, 75, 57 and 56. The high pressure of the fluid in the groove 59 expands the bore 23 to reduce or break the interference fit between the shaft and the impeller while the fluid in the chamber 53 acts to force the piston 42 against the annular shoulder 44 while moving the impeller outwardly along the shaft. As the pressure is increased, the impeller continues to move outwardly along the shaft until the edge 64 of the inner face of the impeller moves outwardly over the O-ring 48 whereupon the seal is lost and the hydraulic pressure drops to zero. At that point, or immediately previous to it, the impeller is loose on the shaft and can be easily removed.

The invention also contemplates increasing the distance that the impeller can be forced outwardly along the shaft by increasing the depth of the counterbore 41 and similarly increasing the length of the sealing ring 42. This accommodates sizing the design to select the distance that the impeller is to be forced along the shaft commensurate with that required to break the interference fit characteristic of the particular angle of the tapered fit joining the impeller to the shaft.

The embodiments of the invention in which an exclusive property or privilege is claimed are defined as follows:

1. A tightly fitted assembly, comprising:
   a shaft member having a free end portion provided with an axially extending tapered surface;
   a second member having a mounting hub provided with a tapered internal bore complimentary to the tapered surface of said shaft member and mounted on said shaft member with an interference fit therebetween;
   an axially extending fluid supply passage in said shaft member adapted to be connected in communication with a source of pressurized fluid;
   a first radially extending fluid passage in said shaft member providing fluid communication between said supply passage and the periphery of said tapered surface;
   stop means on said shaft member;
   axially extending piston cylinder means formed in said second member;
   piston means axially abutting said stop means reciprocably mounted within said piston cylinder means to form a fluid chamber therewithin; and
   a second radially extending fluid passage in said shaft member providing fluid communication between said supply passage and said chamber; whereby
   upon predetermined fluid pressurization of said passages, fluid pressure in said first passage acts to expand the bore in said second member to reduce the interference fit between said members while fluid pressure in said second passage and said chamber acts to urge said second member axially away from the tapered surface of said shaft member.

2. The invention according to claim 1, and
   said second member having a counterbored portion at the inner end of said internal bore to provide said piston cylinder means;
   said piston means being a ring having an inner diameter sized to fit on said shaft member and an outer diameter sized to fit within said counterbored portion;
and
   first and second fluid sealing means on the inner and outer peripheries of said ring, respectively, forming a fluid seal between the ring and said members.

3. The invention according to claim 2, and
   said first and second sealing means being axially offset from one another; and
   said ring having a counterbore forming an annular channel radially aligned with said first fluid sealing means.

4. The invention according to claim 2, and
   said ring having a first groove about its outer periphery and a second groove about its inner periphery;
and
   an O-ring in each of said grooves providing said first and second sealing means.

5. The invention according to claim 1, and
   axially spaced third and forth sealing means disposed about the periphery of said tapered surface forming a pair of fluid seals between the tapered surface and the tapered internal bore of the mounting hub; and
   said shaft member having an annular groove between said third and forth sealing means extending about the periphery of the tapered surface, said groove being in fluid communication with said first radially extending passage.

6. The invention according to claim 1, and
   removable plug means in said supply passage between said first and second radially extending passages for preventing fluid pressurization of said chamber upon fluid pressurization of said supply passage.

7. The invention according to claim 6, and
   said plug means including an attachment portion adapted to be removably secured in the supply passage, a plug body having a conically-shaped nose, and connecting means securing the plug body to the attachment portion in a swivelling fashion; and a conically shaped plug seat formed in the supply passage of the shaft member adapted to receive the nose of the plug body within the seat to close off the supply passage when the attachment portion is secured in the supply passage.

8. The invention according to claim 7, and said attachment portion being an externally threaded screw; and said shaft member having threading within the supply passage adapted to threadably receive said screw.

9. The invention according to claim 7, and said attachment portion having an inner end portion having an axially extending bore;

said plug body having an outer end portion of lesser diameter than the diameter of said bore; and coupling means securing the plug body within the bore to accommodate swivelling movement between the attachment portion and the plug body.

10. The invention according to claim 9, and said outer end portion having an exterior groove about its periphery aligned within the bore; and said coupling means being a set screw threaded through the attachment portion and projecting into the exterior groove to loosely secure the plug body to the attachment portion.

11. The invention according to claim 10, and a venting passage extending through said attachment portion to vent fluid through the attachment portion upon disengaging the plug body from the plug seat.

* * * * *